United States Patent [19]

Kruk et al.

[11] 4,045,855

[45] Sept. 6, 1977

[54] TRUCK BOLSTER LIFTING DEVICE

[75] Inventors: Anthony Richard Kruk, Winnipeg; Richard Bryant, Montreal; Samuel Harper, Winnipeg, all of Canada

[73] Assignee: Canadian Pacific Limited, Montreal, Canada

[21] Appl. No.: 616,269

[22] Filed: Sept. 24, 1975

[51] Int. Cl.[2] .......................... B23P 19/02; B66F 7/26

[52] U.S. Cl. .................................. 29/252; 254/93 R; 254/10.5

[58] Field of Search ......................... 29/225, 244, 252; 254/10.5, 93 R

[56] References Cited

U.S. PATENT DOCUMENTS

| | | | |
|---|---|---|---|
| 3,016,603 | 1/1962 | Rutland, Jr. | 254/93 R |
| 3,329,404 | 7/1967 | Castoe | 254/93 R |

*Primary Examiner*—James L. Jones, Jr.
*Assistant Examiner*—Roscoe V. Parker
*Attorney, Agent, or Firm*—Smart & Biggar

[57] ABSTRACT

An apparatus for use in replacing the bolster-supporting springs between a truck and a bolster of a railway car is disclosed. The apparatus has first engagement means to engage an upper part of the truck, second engagement means to engage the bolster and hydraulically actuated means connected at one end to the first engagement means and at the other end to the second engagement means to urge same together when actuated, whereby the bolster is raised to permit removal and replacement of the springs. Preferably, the first engagement means comprises a pair of hanger bars having hooks at their upper ends to engage the top of the truck and the second engagement means comprises a member slidably mounted on said hanger bars and having a portion insertable into the end of the bolster. The hydraulically actuated means preferably comprises a pair of piston and cylinder arrangements mounted one on each of the hanger bars at its lower end and engaging the slidably mounted member at its upper end.

2 Claims, 2 Drawing Figures

TRUCK BOLSTER LIFTING DEVICE

BACKGROUND OF THE INVENTION

This invention relates to apparatus which facilitates the replacement of bolster-supporting truck springs on railway cars.

Known arrangements for replacing bolster-supporting springs necessitates the removal of the car from the train and placing it on a repair track where heavy jacks and blocking, as well as a firm base for the jacks are available. The subject invention permits the replacement of bolster-supporting springs without the removal of the railway car from the train, thereby minimizing the loss of railway car days. It also avoids the necessity of utilizing heavy, ground-supported jacks or hoists, and can be operated by one person, thereby decreasing the manpower requirements for the job.

SUMMARY OF THE INVENTION

According to the invention there is provided an apparatus for use in replacing the bolster-supporting springs between a truck and a bolster of a railway car, said apparatus comprising first engagement means to engage an upper part of the truck, second engagement means to engage the bolster and hydraulically actuated means connected at one end to said first engagement means and at the other end to said second engagement means to urge same together when actuated, whereby said bolster is raised to permit removal and replacement of the springs.

In a presently preferred embodiment of the invention, said first engagement means comprises a pair of hanger bars having hooks at their upper ends to engage the top of the truck and said second engagement means comprises a member slidably mounted on said hanger bars and having a portion insertable into the end of the bolster, said hydraulically actuated means comprising a piston and cylinder arrangement mounted at its lower end on each of said hanger bars and engaging said member at its upper end.

The hydraulic piston and cylinder arrangements are preferably actuated by a hand pump.

To counteract any tendency of the truck side frame to roll on the convex surface of the journal box wedges as the truck bolster is being raised, a support bar may be adjustably mounted on the lower end of each said hanger bar to extend into engagement with a rail of a track on which the railway car is positioned, whereby to support the lower ends of said hanger bars against movement in the direction of said rail.

BRIEF DESCRIPTION OF THE DRAWINGS

In the accompanying drawings which illustrate one embodiment of the invention by way of example.

DESCRIPTION OF PREFERRED EMBODIMENT

Figure 1:
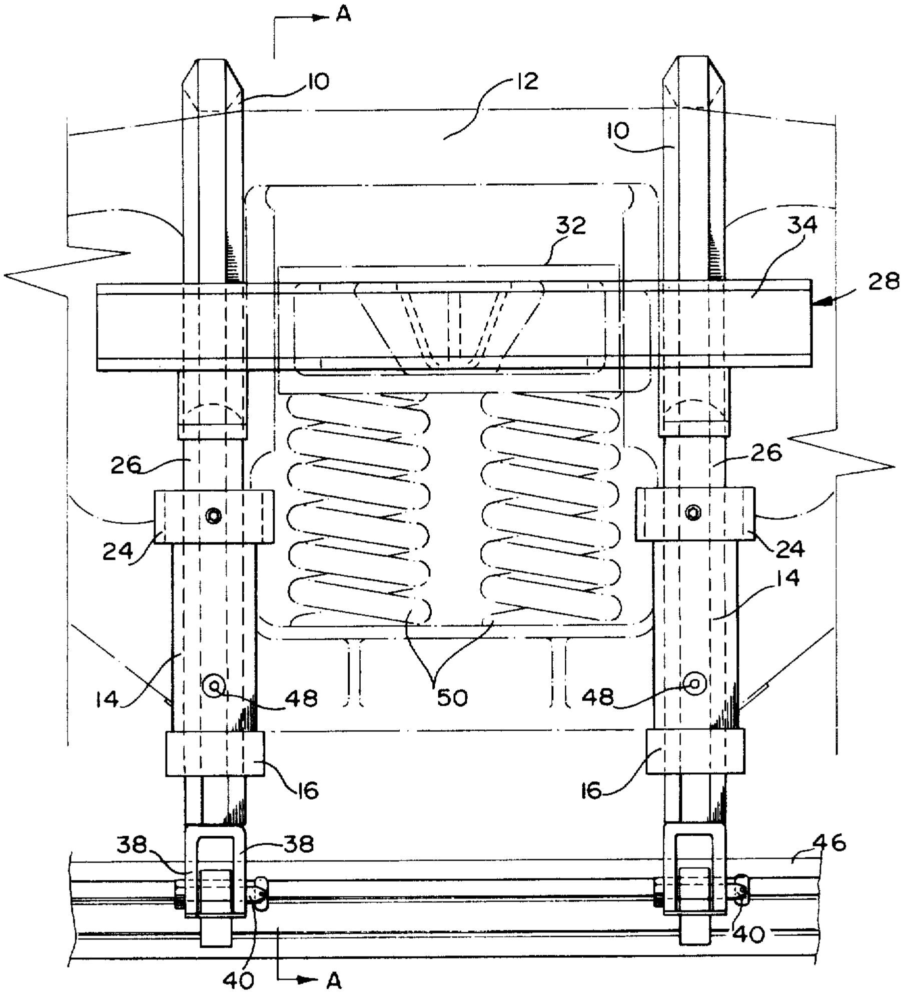
FIG. 1 is an elevational view of apparatus embodying the invention mounted on a truck frame, shown in phantom, and looking at the side of the truck frame.
Figure 2:
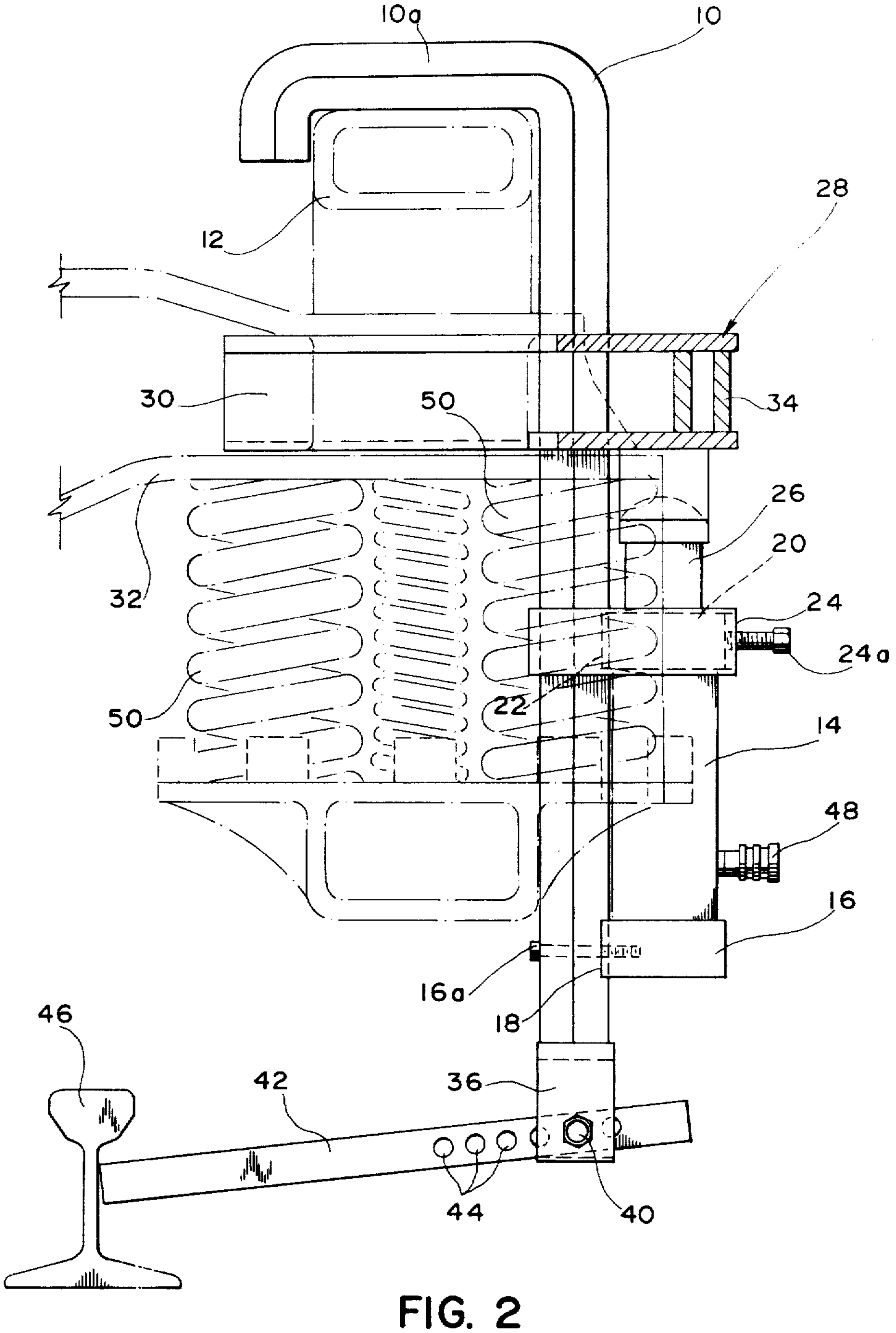
FIG. 2 is a vertical section taken along the line A—A of FIG. 1.

The apparatus shown in the drawings comprises a pair of hanger bars 10 which are hung in a vertical position on a railway car truck frame 12 by hooks 10*a* at their upper ends. Secured to the vertical portion of each of the hanger bars 10 is a respective hydraulic piston-and-cylinder arrangement or ram 14. The lower end of each ram cylinder has a collar 16 secured thereto, each collar engaging a co-operating slot 18 in a hanger bar 10. Suitable fastener means such as screw 16*a* extending through said hanger bar retains said collar 16 in engagement with said slot 18. A second collar 20 at the top of each ram cylinder engages co-operating slot 22 in the associated hanger bar 10. A support bracket 24 encircles said collar 20 and the hanger bar 10 and is secured to said collar 20 by suitable fastener means such as screw 24*a* so as to retain said collar 20 in engagement with its co-operating slot 22.

The upper end of each of the two piston rods 26 of the rams 14 is attached to a truck bolster engaging member 28. The truck bolster engaging member 28 has a T-shaped configuration in plan view, and is of welded metal construction. The stem 30 of the T-shaped bolster engaging member 28 is horizontally disposed and engages in the truck bolster 32. The cross-portion 34 of the T-shaped truck bolster engaging member extends horizontally in front of the two hanger bars 10 and is engaged by the ram pistons at locations adjacent opposite ends of said transverse portions. Adjacent the lower end of each of the hanger bars 10 is a bracket 36 which is secured thereto. Each bracket 36 has a pair of downwardly extending, spaced apart arms 38 and a support bar pin 40 extending horizontally through openings therein. Each support pin 40 passes through one of several openings 44 in an adjustable support bar 42 whereby said support bar is pivotally mounted on said pin 40 at one end. The opposite end of the support bar engages a rail 46 of a railway track on which the railway car is positioned. By selecting the appropriate opening 44 in said adjustable support bar 42 and inserting the pin 40 therethrough, it is possible to maintain the major portion of each hanger bar 10 in a vertical position and resist any tendency of the truck side frame to roll.

Each of the rams 14 includes a coupling 48 to which is attached a connecting hose by means of which hydraulic fluid is pumped into the cylinder by means of a hand pump (not shown).

In order to replace track bolster-supporting springs, utilizing the subject invention, it is a simple matter to hang bars 10 by their hooks 10a on the upper member of a truck frame 12, adjust bars 42 to maintain the major portion of bars 10 vertical and, with portion 30 of member 28 in the bolster 32, actuate the hand pump to raise the bolster free of springs 50. Thereupon, the latter may be removed, new springs substituted and the pressure released from the ram cylinders to allow the bolster to descend to its normal position.

It can be seen that only a one-man operation is involved and that there are no ground-engaging parts demanding a solid base, that there is no need to remove the car from the train and no need to move it to a special repair track.

What we claim as our inventon is:

1. An apparatus for use in replacing the bolster-supporting springs between a truck and a bolster of a railway car, the railway car being positioned on a track, said apparatus comprising a pair of hanger bars laterally spaced apart to provide access therebetween to the bolster-supporting springs when the apparatus is in use on a railway car, first engagement means in the form of hooks on the upper ends of said hanger bars to engage an upper part of the truck, second engagement means comprising a member slidably mounted on said hanger bars to maintain their lateral spacing, and having a portion insertable into the end of the bolster so as to engage the bolster, hydraulically actuated means connected at one end to said hanger bars and at the other end to each second engagement means to urge said first and second engagement means together when actuated, and thus raise said bolster to permit removal and replacement of the springs, said hydraulically actuated means comprising a piston and cylinder arrangement mounted at its lower end on each of said hanger bars and engaging said member at its upper end, a pair of unitary, rigid support bars and means for mounting said support bars on the lower ends of said hanger bars such that each support bar extends into engagement with a rail of the track on which the railway car is positioned, and supports the lower end of the corresponding hanger bar against movement in the direction of said rail, thereby preventing the truck from rolling about a longitudinal axis when the bolster is raised, said support bar mounting means comprising a mounting bracket mounted on the lower end of each hanger bar, means for pivotably connecting each of said support bars to the corresponding bracket, and aperture means cooperating with said connecting means for adjustably mounting each of said support bars at different spaced positions relative to the corresponding hanger bar.

2. The apparatus of claim 1 wherein said bracket comprises a pair of downwardly extending, spaced apart arms, said connecting means comprises a pin removably mounted between said bracket arms, and said aperture means comprises a plurality of longitudinally spaced holes in each of said support bars.

* * * * *